BISTABLE MAGNETIC DECISION SUMMING DEVICE

Filed Feb. 7, 1964

WITNESSES

Leon J. Taza

James F. Young

INVENTORS
William C. Mann and
Leland E. Hayden
BY Dean Schron
ATTORNEY

United States Patent Office 3,443,116
Patented May 6, 1969

3,443,116
BISTABLE MAGNETIC DECISION SUMMING DEVICE

William C. Mann, Laurel, and Leland E. Hayden, Halethorpe, Md., assignors to Westinghouse Electric Corporation, Pittsburgh, Pa., a corporation of Pennsylvania Filed Feb. 7, 1964, Ser. No. 343,290
Int. Cl. H01f *27/42, 29/42, 31/06*
U.S. Cl. 307—88 6 Claims

ABSTRACT OF THE DISCLOSURE

A magnetic decision circuit wherein each input core of a plurality of input cores receives one of a group of redundant binary signals. A drive signal is provided on an output winding associated with each core only when the input signal changes binary states. The output windings of the cores are linked to a summing magnetic core having two stable states of magnetization and which will assume a first of said states when a predetermined number of first polarity drive signals are provided and will assume the second of said states when a predetermined number of opposite polarity drive signals are provided. The threshold for switching the summing core may be chosen such that the core will switch when a majority of all the input signals are correct or the threshold may be chosen such that an output signal will be provided with only one correct working input.

This invention in general relates to signal restoring circuits, and more in particular, to a decision circuit utilizing magnetic components for use in redundant logic systems.

In recent years various novel schemes have been been proposed to improve digital system reliability through the use of redundant equipment. Various types of redundancy techniques utilize redundant circuits wherein a correct output signal is provided even though components within the system have reverted to a failed condition. One type of redundant circuit is the majority voter which will provide an output signal identical to the majority of input signals received. In many instances a majority voter will receive a majority of incorrect signals and thereby provide incorrect output signals even though correct input signals are present.

It is, therefore, one object of the present invention to provide a decision circuit for a redundant logic system which will provide a correct output signal even if all but one input signals have failed.

It is a further object to provide a decision circuit which will provide a correct output signal in accordance with a desired predetermined number of correct input signals.

Other types of circuits for redundant systems utilize complex arrangements of semiconductor circuits which may be unreliable and expensive. In addition, the complexity of the circuit may also add to the unreliability factor.

It is, therefore, another object of the present invention to provide a decision circuit which eliminates the need for highly reliable semiconductor devices.

It is a further object to provide a decision circuit which is relatively inexpensive and rugged.

Another object is to provide a decision circuit for a redundant logic system which circuit is inherently reliable.

In a copending application Ser. No. 232,104 filed Oct. 22, 1962 and now Patent 3,254,326, in the name of William C. Mann and assigned to the assignee of the present invention, there is described and claimed a decision circuit which operates on the change of redundant input signals between times $T_N$ and $T_{N+1}$, to provide a correct output signal.

The present invention utilizes the principles of the above-identified application in a less complex version thereof, thereby eliminating various components to increase inherent reliability. In accordance with the objects of the present invention, magnetic means are provided for receiving a plurality of binary input signals to sense a change in the signals as they switch between binary values. The magnetic means are coupled to a summing magnetic core, of the type capable of assuming at least a first and second flux pattern, to place the core into a first flux pattern if a predetermined number of input signals change to a first of the binary values, and to place the core into its second flux pattern if a predetermined number of input signals change to the other of the binary values. In this manner the magnetic core can be switched between its first and second flux patterns, representative of two binary states, in accordance with changing input signals. Means are additionally provided to sense the flux pattern of the magnetic core for providing an output signal.

The above stated, as well as further objects and advantages of the present invention will become more fully apparent upon a reading of the following detailed specification taken in conjunction with the drawings, in which.

Figure 1:
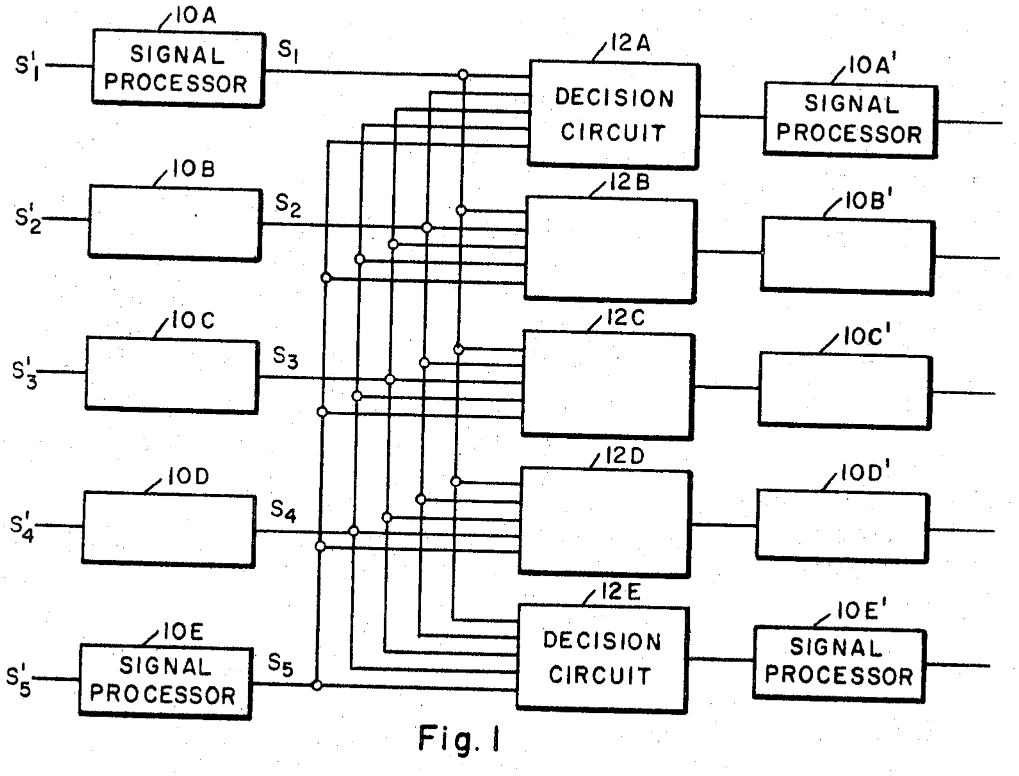
FIGURE 1 illustrates a portion of a typical redundant system in which the present invention finds utility.
Figure 2:
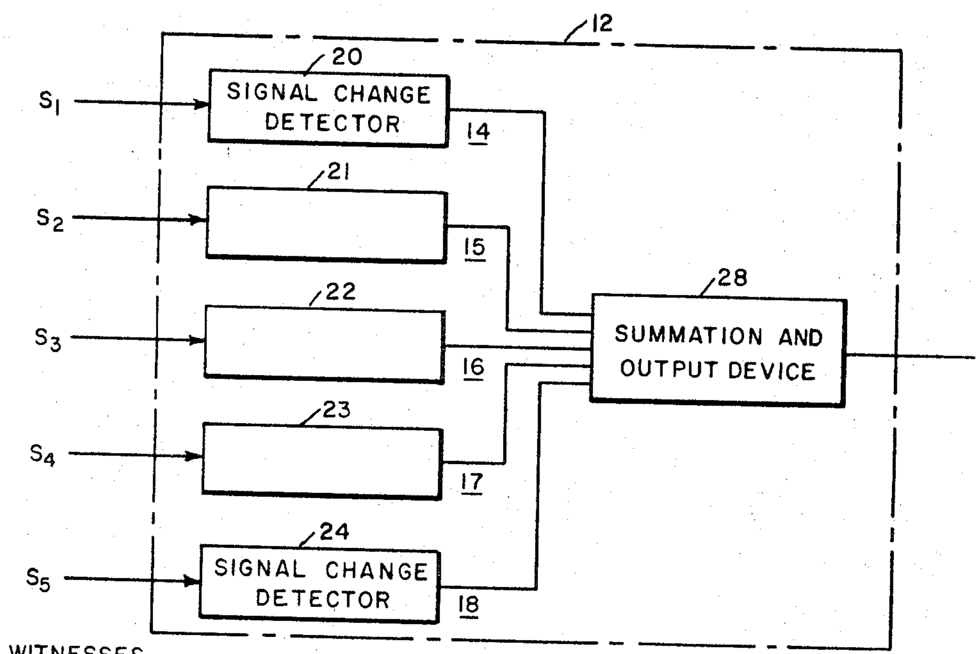
FIG. 2 illustrates, in block diagram form, a more detailed version of the decision circuit shown in FIG. 1.

Referring now to FIG. 1, there is shown one type of redundant system in which the present invention finds utility. Each of the signal processors 10A through 10E receive a signal $S_1'$ to $S_5'$, respectively, to provide a respective output signal $S_1$ through $S_5$. Each of the signal processors 10A through 10E are identical and should provide identical signals if the signals received were identical and no circuit failures have occurred in the signal processors. In various instances, however, one or more of the signals $S_1$ to $S_5$ may become incorrect and revert to a failed condition. Each of the decision circuits 12A through 12E, in FIG. 1, functions to propagate correct information signals even though some received input signals have reverted to a failed condition. It is seen that each of the signal processors 10A through 10E provides an output to each of the decision circuits 12A through 12E, the output signals of which are fed to a desired utilization means such as an additional plurality of signal processors 10A' through 10E' shown. Although a redundancy in the order of five is shown, it is to be understood that more or fewer stages and signals may be provided. Each of the decision circuits of FIG. 1 receives a plurality of input signals representing all of the output signals of a previous redundant stage although it is to be understood that other embodiments may use only some of the previous redundant stage output signals. In FIG. 2 there is shown in somewhat more detail a typical decision circuit of FIG. 1 representing an embodiment of the present invention.

The decision circuit 12 of FIG. 2 includes a plurality of input lines 14 to 18 each respectively including a signal change detector 20 to 24 for providing signals to the summation and output device 28 which will provide a correct output signal in accordance with a predetermined number of correct input signals presented to signal change detectors 20 to 24. The operation of the circuit of FIG.

Figure 3:
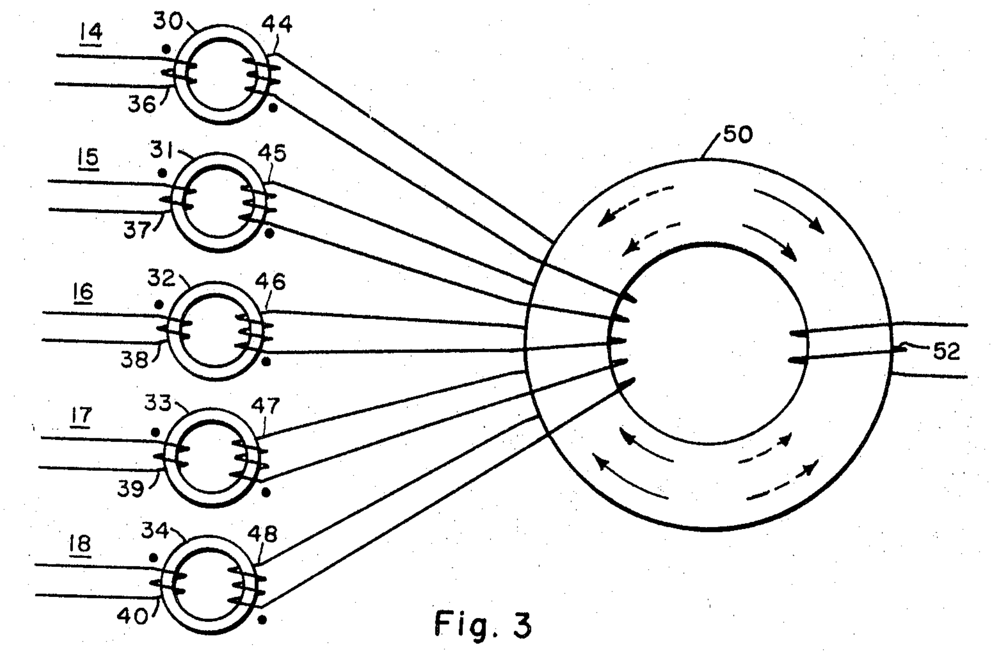
FIG. 3 illustrates one embodiment of the present invention.

2 may best be understood by reference to the detailed drawing of FIG. 3.

In FIG. 3 there is shown the plurality of input lines 14 to 18 each including a magnetic core 30 to 34 respectively. Although not limited thereto, the cores 30 to 34 are preferably of a square loop hysteresis material such that two stable remnant states of magnetization are possible. Each of the cores 30 to 34 include a first, or input winding 36 to 40, respectively, for receiving a plurality of binary input signals which, if previous stages are operating correctly, should all be identical at the same instant of time, and should switch between binary values at the same time. In order to couple the changing input signals to core 50, there is additionally associated with each magnetic core 30 to 34 a second, or output winding 44 to 48, respectively, providing a drive signal when an input signal changes binary states. By way of example, if a binary system is utilized wherein a ZERO is represented by a relatively more negative voltage than a ONE, a ONE may be represented by some relatively more positive voltage than a ZERO. Considering line 14 as representative, an input signal on winding 36 which switches from a ZERO to a ONE will cause output winding 44 to provide a positive signal emanating from the dot side of the winding. Conversely, if an input signal on line 36 switches from a ONE to a ZERO, a negative signal emanating from the dot side of the output winding 44 will be provided. Each of the remaining input lines 15 to 18 operate in an identical manner. It is, therefore, seen that as the input signals switch between binary values, drive signals will be provided on the output windings 44 to 48 having either a first polarity or an opposite polarity as the input signals switch from a ZERO to a ONE, and from a ONE to a ZERO, respectively. The invention takes advantage of the fact that if one of the previous circuits providing an input signal fails, it will often fail in such a way that an input signal will no longer vary; that is, an input signal will generally revert to a steady state ONE or ZERO condition. With a steady state signal appearing on any of the input windings 36 to 40, no flux reversal is experienced in the associated magnetic core and consequently no output drive signal will be provided. By way of example, if at time $T_0$, ZERO signals appear on input windings 36 to 40, and the input signal on winding 36 fails such that at time $T_1$ when the signals on windings 37 to 40 switch to a ONE value the input signal on winding 36 remains at a ZERO value; output drive signals will appear on output windings 45 to 48 whereas no signal will appear on output winding 44.

Each of the output windings 44 to 48 is coupled to a summing or threshold magnetic core 50. Core 50 is preferably of the type wherein flux, in a direction as symbolically represented by the clockwise solid arrows, represents one flux plattern, and by the dotted counterclockwise arrows represents a different flux pattern and may assume either one of these flux patterns upon the application of a drive signal equal to or exceeding a positive or negative threshold level. The drive signal for switching the magnetic core 50 between these flux patterns is provided by the individual drive signals appearing on the winding 44 to 48. The totality of drive signals coupling the magnetic core 50 must equal, or exceed, a positive or negative threshold level in order to reverse the flux in the core 50. This threshold may be set by the number of turns of windings linking the core 50, the strength of an individual drive signal, and the known characteristics of the core 50.

It may be seen, therefore, that if all the drive signals appearing on output windings 44 to 48 are identical, a flux reversal in magnetic core 50 will be experienced. The threshold level may be chosen such that less than the full complement of drive signals will switch the core, so that a flux reversal may be experienced with less than a majority of inputs working correctly and may be so designed such that if all but one input line fails, correct operation may still be obtained. Output means in the form of winding 52 is coupled to the magnetic core 50 in order to sense the flux pattern therein upon switching, so as to provide an output signal which in turn is indicative of the correct input signals since an output signal, as was explained, which has failed, does not produce a drive signal and does not contribute to the switching of the summing magnetic core 50.

Consider, by way of example, a situation wherein at time $T_N$ the flux in core 50 is in a counterclockwise direction as noted by the dotted arrows and may be representative of a ZERO state. At this time $T_N$ suppose further that the input signals to input windings 36 to 40 are all correct and switch from a ZERO to a ONE condition. A first polarity drive signal is induced in each of the windings 44 to 48 by virtue of the switching of the input signal and if the switching threshold of core 50 is chosen such that two drive signals will be enough to switch the core, the core 50 will reverse to its other flux pattern represented by the solid arrows and may be considered as a ONE state. The flux reversal in the core 50 produces a first polarity output signal on winding 52 which is representative of a ONE signal identical to the ONE signals appearing on input lines 36 to 40. Suppose further that the input signal to input line 18 fails and reverts to its ONE state and at time $T_{N+1}$ the remaining input lines receive a ZERO signal. The changing at time $T_{N+1}$ from a ONE signal to a ZERO signal induces a second polarity drive signal in output windings 44 to 47 and since the input signal to input winding 40 has failed, no output drive signal will appear on output winding 48. Since the threshold was chosen to be two, the four substantially identical drive signals present will again reverse the flux in the summing magnetic core 50 to the counterclockwise direction representative of a ZERO, the flux reversal causing a second polarity output signal on winding 52 thereby representing a ZERO signal identical to the correct input signals. Suppose now that the input signal to input line 16 becomes incorrect and reverts to its steady state ZERO condition such that when the input signals are supposed to switch from a ZERO to a ONE condition, only input lines 14, 15 and 17 will be receiving correct input signals to provide drive signals on output windings 44, 45 and 47, respectively. Since the input signal to lines 16 and 18 have failed and have become incorrect, no output drive signal will appear on output windings 46 or 48. The three substantially identical signals appearing on the windings 44, 45 and 47 will be of the same polarity and above the chosen threshold level of two to thereby switch the core 50 back to its flux condition representaative of a ONE signal, the flux reversal causing an output signal on winding 52 indicative of the correct input signals. An output signal on windings 52 indicative of correct input signals will still be provided until, in the present example, less than two of the inputs have reverted to a failed condition. In FIG. 3, an output signal indicative of the correct input signals appears on winding 52 which the core 50 switches from one remnant state to the other remnant state of magnetization. In many applications it is desirable to sense the flux pattern at will, so that an output signal, indicative of the stored flux condition, may be obtained at a time other than that of flux reversal. For another embodiment of the present invention in which the flux pattern may be determined at will, reference should now be made to FIG. 4.

The input lines with their associated magnetic cores and input and output windings are identical to those of FIG. 3 and have like reference numerals. The embodiment of FIG. 4 utilizes, in place of the magnetic core 50 of FIG. 3, a multi-aperture magnetic core element 60 having an input aperture 62 and an output aperture 64. A central aperture 66 completes the geometrical configuration. A multi-aperture magnetic core is capable of assuming a first flux pattern and at least a second flux pattern upon the application of drive signals exceeding polarity threshold levels respectively.

Figure 4:
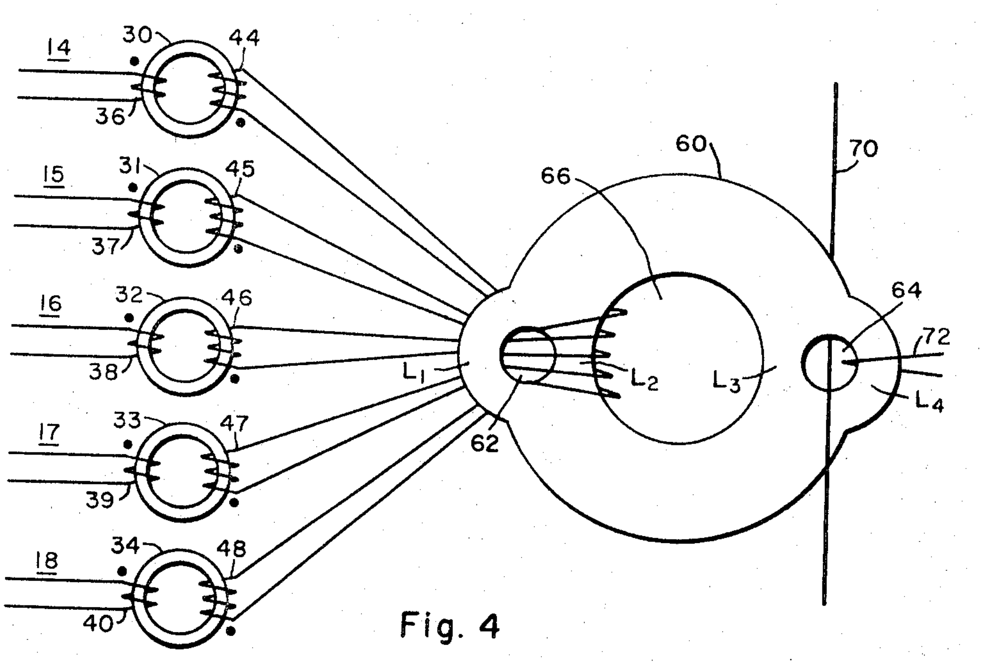
FIG. 4 illustrates another embodiment of the present invention.

A first and second leg $L_1$ and $L_2$ is defined between the input aperture 62 and the outer circumference of the core 60 and between the input aperture 62 and the inside circumference of the core 60, respectively. In a similar manner, legs $L_3$ and $L_4$ are defined in the vicinity of the output aperture 64. Each of the output windings 44 to 48 of the input lines 14 to 18 is coupled to the input aperture 62 to place the multi-aperture magnetic core 60 into its first flux pattern only if the totality of the drive signals provided by the output windings exceed for example, a chosen negative threshold, and to place the core element 60 into its second flux pattern only if the totality of drive signals exceed the positive threshold level of the core 60. In order to sense which of the first or second flux patterns is being stored in the multi-aperture magnetic core 60 there is provided an interrogate winding 70 passing through the output aperture 64 in addition to a sense winding 72 passing therethrough. For a more detailed explanation of how the input lines 14 to 18 cooperate with a multi-aperture magnetic core element, as shown in FIG. 4, reference should now be made to FIGS. 5, 6 and 7.

Figure 5:
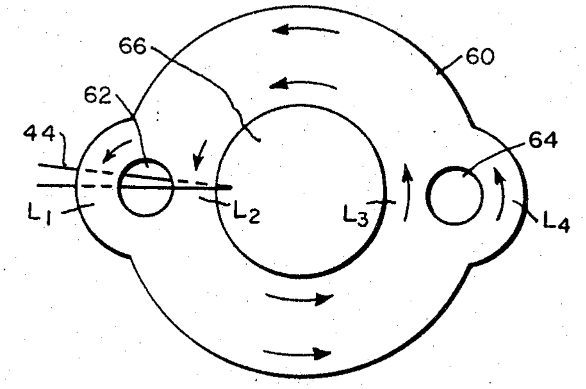
FIGS. 5, 6 and 7 illustrate various flux patterns of the multi-aperture core of FIG. 4.
Figure 6:
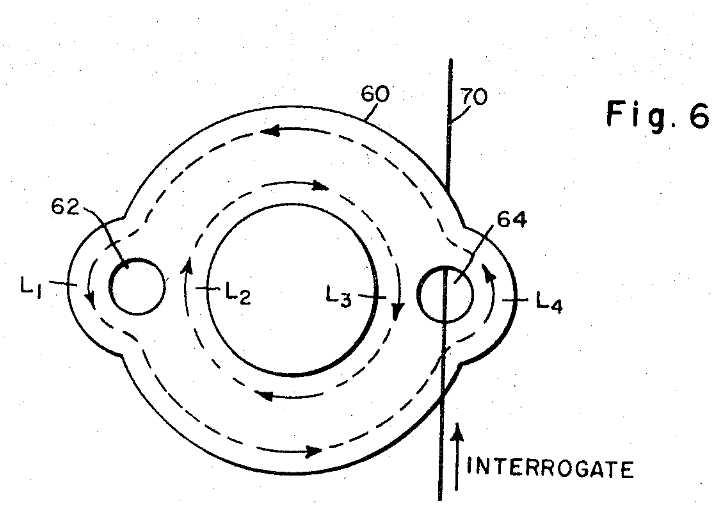
Figure 7:
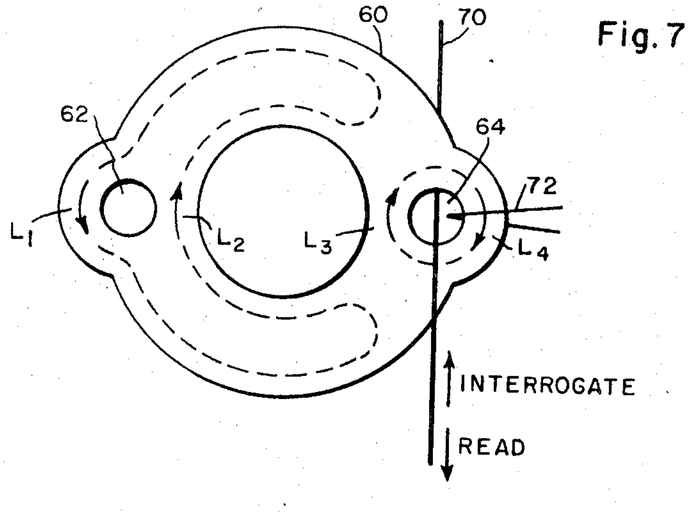

FIG. 5 shows the multi-aperture magnetic core element 60 having a flux orientation representing for example, a ZERO state. It is seen that the total flux in the core 60 is in a counterclockwise direction such that the flux in legs $L_1$ and $L_2$ is in a downward direction and the flux in legs $L_3$ and $L_4$ is in an upward direction. For purposes of clarity only one of the windings, for example winding 44, is shown linking the input aperture 62 such that the dot side of the winding passes beneath the core, through the input aperture 62, passes above the core and through the central aperture 66, beneath the core 60, and then back to complete the circuit of the output winding of core 30 (FIG. 4). Windings 45 to 48 are similarly linked to the input aperture 62. Core 60 may assume a second flux pattern if the totality of drive signals provided are equal to or are above the aforementioned threshold level. FIG. 6 shows the second flux pattern representing for example a ONE state wherein flux is in a counterclockwise direction in legs $L_1$ and $L_4$ and is in a clockwise direction in legs $L_2$ and $L_3$. If a positive interrogate pulse is now applied to the interrogate line 70 in the direction as shown by the arrow, the flux in the vicinity of the output aperture 64 will reverse and the core will assume a flux pattern as shown in FIG. 7 wherein flux is in a downward direction in leg $L_1$, in an upward direction in leg $L_2$, upward in leg $L_3$ and downward in leg $L_4$. It is to be noted that the interrogate pulse applied to line 70 is below the threshold level for switching the flux in the entire core but is of sufficient magnitude to switch the flux locally about the output aperture 64 when the core is in the ONE state. FIG. 7, therefore, illustrates a third type of flux pattern which represents a ONE state, as does the flux pattern of FIG. 6. By applying a read pulse in the direction as shown by the arrow to line 70, which pulse is below the threshold level of the core 60, the flux in the vicinity of the output aperture 64 will reverse itself, the flux reversal casing an output signal on sense winding 72 indicating the storage of a ONE state in the core 60. Upon a reversal of the flux in the legs $L_3$ and $L_4$ the core again assumes the flux pattern representing the ONE state as shown in FIG. 6. If a drive signal is now applied to the input aperture and exceeds the negative threshold level, the flux pattern will switch to a ZERO state as shown in FIG. 5. With the core 60 in a ZERO state, the application of an interrogate pulse to line 70 will be of insufficient magnitude to reverse the flux around the output aperture 64 and consequently no flux reversal takes place and no output signal on sense winding 72 is provided, thus indicating the storage of a ZERO state.

Accordingly, there has been provided a decision circuit which will produce a correct output signal in response to a predetermined number of correct input signals and will continue to provide a correct output signal even though input signals have reverted to a failed condition. This is accomplished by the inclusion of a plurality of magnetic cores which sense a change in binary values of the input signals to provide a drive signal on an associated output winding, the totality of drive signals functioning to switch a magnetic core element between two stable remnant states of magnetization. Means are additionally provided to sense these two states in order to provide an output signal. The decision circuit herein eliminates the need for complex circuit arrangements utilizing semiconductors which may be inherently unreliable. A number of drive signals necessary for switching the output magnetic core element may be chosen by the consideration of such factors as the magnitude of the drive signal in each input line, the number of turns linked to the magnetic core element, and the material and geometric configuration of the output core element itself. A three aperture magnetic core element has been shown by way of example; other types of magnetic cores, including multi-aperture cores may also be utilized as becomes obvious to those skilled in the art. Although magnetic cores have been described it is understood that other magnetic means may be utilized herein with equal facility. One other type of means is the common magnetic thin film which may exhibit two remnant states of magnetization.

Although the present invention has been described with a certain degree of particularity, it should be understood that the present disclosure has been made by way of example and that modifications and variations of the present invention are made possible in light of the above teachings.

What is claimed is:

1. A decision circuit comprising:
first magnetic means responsive to a plurality of binary input signals for sensing a change in said signals as they switch between binary values;
a summing magnetic means of the type capable of assuming a first and second flux pattern;
means coupling said first magnetic means and said summing magnetic means for placing said summing magnetic means into said first flux pattern only in response to a predetermined number of said input signals changing to a first of said binary values, and to place said summing magnetic means into said second flux pattern only in response to a predetermined number of said input signals changing to the other of said binary values; and
means for sensing the flux pattern of said summing magnetic means for providing an output signal indicative of said binary values.

2. A decision circuit comprising:
a plurality of input lines;
each said line including a magnetic core having an input winding for receiving binary input signals and an output winding for providing a drive signal only when an input signal changes binary states;
said drive signal having a first polarity when an input signal changes from a first to an opposite state and having an opposite polarity when an input signal changes back to said first state;
a threshold magnetic core having at least two stable remnant states of magnetization;
each output winding of said input lines coupled to said magnetic core for placing said core into on of said states only when a predetermined number of said dirve signals have said first polarity, and to place said core into the other of said states only when a predetermined number of said drive signals have said opposite polarity; and
means for determining the state of magnetization of said threshold magnetic core.

3. An error cancelling circuit comprising:
a plurality of magnetic cores each having a first winding for receiving binary input signals and a second winding for providing a switching signal only when a binary input signal changes states;

a summing magnetic core of the type wherein a first flux pattern represents a one state and at least a second flux pattern represents an opposite state of operation;

said second windings being linked to said summing magnetic core to switch said summing magnetic core between said flux patterns only if at least a predetermined number of said second windings provide substantially identical signals; and means for sensing the flux condition of said summing magnetic core for providing an output signal indicative of said flux condition.

4. An error cancelling decision circuit comprising:

magnetic core means having a plurality of apertures and capable of assuming at least two different flux patterns upon the application of a drive signal exceding a positive and negative threshold valve respectively;

a plurality of input magnetic means;

an input winding associated with each said magnetic means for receiving input signals;

an output winding associated with each said magnetic means for providing a drive signal only in response to a change in an input signal;

each said output winding being coupled to said magnetic core means to switch said magnetic core means between said different flux paterns only when the sum of the drive signals on said output windings exceds said threshold value; and means for sensing the flux pattern in said magnetic core means.

5. An error cancelling decision circuit comprising:

a multi-aperture magnetic core element having a central and an input and output aperture thereby defining a first and second leg in the vicinity of said input aperture, and a third and fourth leg in the vicinity of said output aperture and capable of assuming a first and second flux pattern upon the application of a drive signal exceeding a positive and negative threshold value, respectively;

a plurality of input lines each including a magnetic core;

an input winding associated with each said core for receiving input signals;

an output winding associated with each said core for providing a drive signal only in response to a change in an input signal;

each said output winding being looped around one of said legs of said input aperture to switch said multi-aperture magnetic core between said first and second flux patterns only when the sum of the drive signals on said output windings exceeds said threshold value; and means for sensing the flux pattern in the vicinity of said output aperture.

6. A decision circuit comprising:

a multi-aperture magnetic core element having at least an input and output aperture and capable of assumming a first flux pattern and a second flux pattern upon the application of a switching signal exceeding one of a positive and negative threshold level, respectively;

a plurality of input lines each including a magnetic core;

an input winding for each said magnetic core for receiving input signals;

an output winding for each said magnetic core for providing a switchnig signal only in response to a change in an input signal;

the output windings of each said magnetic core coupled to said input aperture to place said multi-aperture magnetic core into said first flux pattern only if the totality of said switching signals provided by said output windings exceed one of said threshold levels, and to place said multi-aperture magnetic core into said second flux pattern only if the totality of said switching signals exceed the other of said threshold levels; and means for sensing a flux condition in the vicinity of said output aperture.

References Cited

UNITED STATES PATENTS

| | | | |
|---|---|---|---|
| 3,300,652 | 1/1967 | Zuccaro | 307—88 |
| 2,927,220 | 3/1960 | Crane | 307—88 |
| 3,207,912 | 9/1965 | Mallinson | 307—88 |
| 3,244,902 | 4/1966 | King et al. | 307—88 |

BERNARD KONICK, *Primary Examiner.*

PHILIP SPERBER, *Assistant Examiner.*

U.S. Cl. X.R.

340—146.1